Feb. 2, 1932.                K. WILDE                  1,843,435
            TRANSMITTER FOR REMOTE CONTROL INDICATOR SYSTEMS
                      Original Filed Oct. 22, 1927
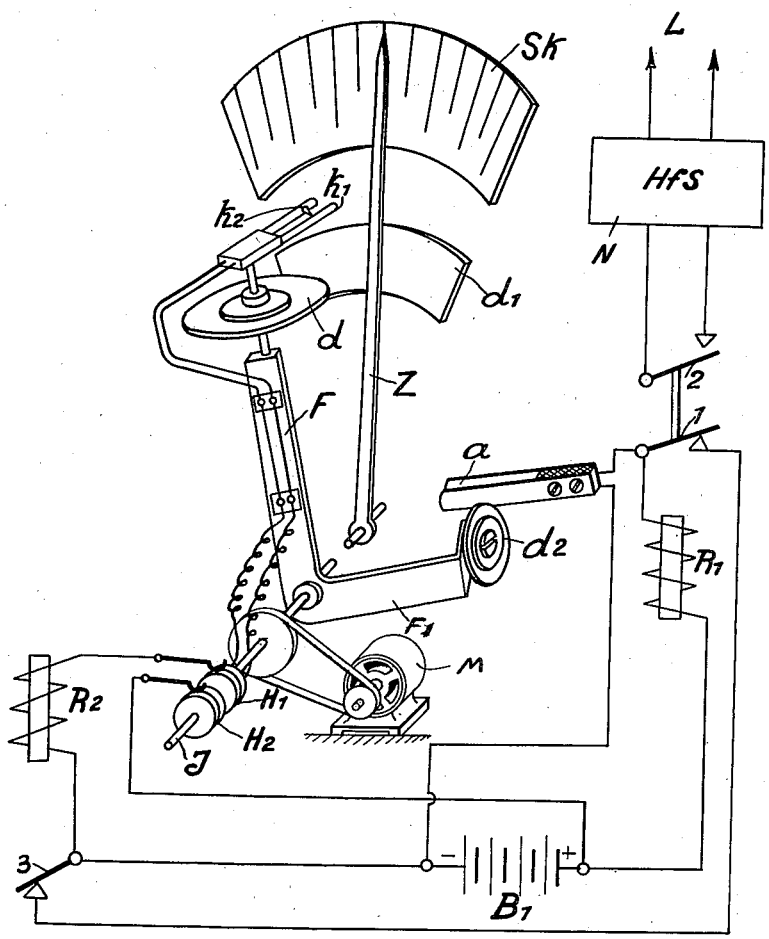
Inventor
Kurt Wilde
By
Attorneys Patented Feb. 2, 1932

1,843,435

UNITED STATES PATENT OFFICE

KURT WILDE, OF BERLIN-WILMERSDORF, GERMANY, ASSIGNOR TO DEUTSCHE TELE-PHONWERKE UND KABELINDUSTRIE AKTIENGESELLSCHAFT, OF BERLIN, GERMANY, A CORPORATION

TRANSMITTER FOR REMOTE CONTROL INDICATOR SYSTEMS

Original application filed October 22, 1927, Serial No. 227,933, and in Germany December 4, 1926. Divided and this application filed February 4, 1929. Serial No. 337,443.

This application is a division of my prior patent application Serial No. 227,933 filed October 22, 1927.

The invention relates to the transmitters of apparatus for electrically transmitting to a distance the indications of a measuring instrument or the like, of the kind in which a contact is actuated in conjunction with the pointer by a periodically moving tester, and consists essentially in the pointer being held by the tester itself during the contact period, and thus secured against being moved by the tester.

An advantageous construction for this purpose consists in the provision of the tester with a wheel which runs over the pointer, pressing the latter against a fixed backing in so doing, and is sufficiently large not to move the pointer before it. This arrangement makes it possible for the pointer itself not to form part of the circuit, but for the contact to be made through members arranged on the tester alone, although my invention is not limited to such construction and embraces also devices in which the pointer itself comprises part of a circuit.

Further features of the invention will appear from the following description and the accompanying drawing.

The drawing shows in perspective an example of transmitter embodying the invention.

The pointer Z of a measuring instrument not otherwise shown, of which the indications are to be transmitted, swings freely as usual before a scale $Sk$ and fixed sector $d_1$. Coaxial with the pointer axis is a shaft J which is rotated continuously in a clockwise direction, for instance, by an electric motor M, and carries a tester F. This includes a freely rotatable wheel $d$ and two contact springs $k_1$, $k_2$, which normally do not touch and which are connected to two slip rings $H_1$, $H_2$ on the shaft J. The whole wheel $d$ or at least its rim, is of rubber or other elastic material, and it is large enough not to push the pointer Z before it.

During rotation of the shaft J the wheel $d$ runs over the pointer Z, presses it against the sector $d_1$ in so doing and thus holds it fast. Simultaneously the longer contact spring $k_1$ touches the pointer Z and is thus caused to make contact with the shorter contact spring $k_2$. In this way contact is made between the springs $k_1$ and $k_2$, exactly at the point where the pointer is for the time being located, so that exactly the correct magnitude of movement of the pointer is transmitted to the receiver and not a movement which is too great owing to carrying forward of the pointer by the tester F.

The other features of the above described transmitter should be constructed to correspond with the receiver, not illustrated, with which it is to cooperate.

In the example illustrated a receiver is presumed of which the pointer or the like is periodically set by a continuously rotating motor corresponding with the indication for the time being of the pointer Z of the transmitter, by the setting up of two contacts in the transmitter, of which the first takes place at a fixed point and the second in the manner above described when the wheel $d$ runs over the pointer Z.

For this purpose the tester F has an arm extending say at right angles to it and bent backwards at the end, carrying a roller $d_2$. During rotation of the shaft J the roller $d_2$ runs over and thus closes a contact $a$. The contact $a$ is so arranged that it is closed when the tester F is opposite the zero mark on the scale $Sk$. In the drawing the tester F is shown in a position intermediate between this and the pointer Z.

With this arrangement, the above described transmitter operates in the following manner in conjunction with a battery $B_1$, two relays $R_1$, $R_2$ and a high frequency sender N connected to lines L leading to the receiver.

At each revolution of the shaft J, the contact $a$ is first closed when the tester F passes over the zero mark of the scale $Sk$ by the roller $d_2$ and the relay $R_1$ is thereby excited so that it attracts both its armatures 1, 2. The armature 1 closes a holding circuit over its front contact, and over the back contact and armature 3 of the second relay $R_2$, so that the relay $R_1$ remains excited for the time being after the contact $a$ has opened. The second armature 2 of the relay $R_1$ opens the short circuit of the high frequency sender N so that high frequency currents start and continue to flow for the time being over the lines L to the receiver.

Upon further rotation of the shaft J, the wheel $d$ runs over the pointer Z when the contact springs $k_1$, $k_2$ touch so that the relay $R_2$ is excited. The latter attracts its armature 3 thus breaking the holding circuit of the relay $R_1$ when both its armatures are released and the flow of high frequency current over the lines L to the receiver ceases.

At each revolution of the tester F the receiver will accordingly be set corresponding to the position of the pointer Z by a flow of current whose period is proportional to the swing of the pointer Z, that is, to the time which elapses between the closing of the contact $a$ and the touching of the two contact springs $k_1$, $k_2$.

Naturally other kinds of current could be used for operating the receiver. High frequency currents as described are best however, since they are not so liable to disturbances as other kinds and because they render possible the use of lines already existing between the transmitting and receiving points for other purposes.

The invention is not limited to the example described and illustrated. Thus for example with a suitable arrangement of receiver, it is not necessary for current to flow continuously over the lines L to the receiver during the time between the closing of the contact $a$ and the touching of the contact springs $k_1$, $k_2$. Further, the contact $a$ could be arranged to be closed when the tester F moves past the end point of the scale $Sk$. In this case not the magnitude of swing of the pointer Z, but its complement would be transmitted, and the pointer or the like of the receiver would have to move from right to left instead of from left to right. Finally the two relays $R_1$, $R_2$ could be replaced by a single relay with two windings acting in the same way.

What I claim is:—

1. In a transmitter of the kind set forth, the combination with a measuring instrument and the scale and pointer thereof, of a movable tester, means for moving the latter periodically over said pointer and in contact therewith, an electrical circuit for controlling the transmission to a distant point of the readings of said measuring instrument and including a contact device associated in the said tester and operated during the movement of said tester at an instant corresponding to the position of said pointer, and means on said tester operative to hold the pointer stationary during the actuation of said contact device.

2. In a transmitter of the kind set forth, the combination with a measuring instrument and the scale and pointer thereof, of a movable tester, means for moving the latter periodically over said pointer and in contact therewith, an electrical circuit for controlling the transmission to a distant point of the readings of said measuring instrument and including a contact device associated with said tester and operated during the movement of said tester at an instant corresponding to the position of said pointer, a fixed backing adjacent to said pointer, and means on said tester operative to clamp the pointer against said backing during the actuation of said contact device.

3. In a transmitter of the kind set forth, the combination with a measuring instrument and the scale and pointer thereof, of a movable tester, means for moving the latter periodically over said pointer and in contact therewith, an electrical circuit for controlling the transmission to a distant point of the readings of said measuring instrument and including a contact device associated with said tester and operated during the movement of said tester at an instant corresponding to the position of said pointer, a fixed backing behind said pointer, and a wheel mounted on the tester and arranged to run on said backing and to clamp the pointer thereto during the actuation of said contact device, said wheel being large enough not to move the pointer before it.

4. In a transmitter of the kind set forth, the combination with a measuring instrument and the scale and pointer thereof, of a movable tester, means for moving the latter periodically over said scale and said pointer, an electrical circuit for controlling the transmission to a distant point of the readings of said measuring instrument and including a contact device arranged to be operated during the movement of said tester at an instant corresponding to the position of said pointer, said contact device comprising a short contact blade upon the tester, and a long contact blade upon the tester positioned to be engaged by the pointer and touch said short blade when so engaged, and means for holding the pointer stationary when the tester is passing the same.

5. In a transmitter of the kind set forth, the combination with a measuring instrument and the scale and pointer thereof, of a movable tester, means for moving the latter periodically over said scale and said pointer, an arm on said tester, and an electrical circuit for controlling the transmission to a distant point of the readings of said measuring instrument and including a pair of contacts fixed in the path of movement of said arm and in such position as to be closed by said arm as the tester passes one end of the instrument scale, and a contact device associated with said tester and actuated during the movement of the latter to indicate the position of said pointer.

6. In a transmitter of the kind set forth, the combination with a measuring instrument and the scale and pointer thereof, of a movable tester, means for moving the latter periodically over said pointer and in contact therewith, an electrical circuit for controlling the transmission to a distant point of the readings of said measuring instrument and including a contact device associated with said tester and operated during the movement of said tester at an instant corresponding to the position of said pointer, a fixed backing behind said pointer, and a wheel mounted on the tester and arranged to run on said backing and to clamp the pointer thereto during the actuation of said contact device, said wheel being large enough not to move the pointer before it and having a running surface of elastic material upon its circumference.

7. In a transmitter of the kind set forth, the combination with a measuring instrument and the scale and pointer thereof, of a movable tester, means for moving the latter periodically over said scale and said pointer, means for holding the pointer stationary when the tester is passing the same, an arm on said tester, and an electrical circuit for controlling the transmission to a distant point of the readings of said measuring instrument and including a pair of contacts fixed in the path of movement of said arm and in such position as to be closed by said arm as the tester passes one end of the instrument scale, and a contact device associated with said tester and actuated during the movement of the latter to indicate the position of said pointer.

8. In a transmitter of the kind set forth, the combination with a measuring instrument and the scale and pointer thereof, of a movable tester, means for moving the latter periodically over said scale and said pointer, an electrical circuit for controlling the transmission to a distant point of the readings of said measuring instrument and including a contact device arranged to be operated during the movement of said tester at an instant corresponding to the position of said pointer, said contact device comprising a short contact blade upon the tester, a long contact blade upon the tester positioned to be engaged by the pointer and touch said short blade when so engaged, means for holding the pointer stationary when the tester is passing the same, an arm upon the tester, and a second pair of contact blades fixed in such position as to be closed by said arm as the tester passes one end of the instrument scale.

9. In a transmitter of the kind set forth, the combination with a measuring instrument and the scale and pointer thereof, of a movable tester, means for moving the latter periodically over said scale and said pointer, a fixed backing behind the pointer, a wheel on the tester running on said fixed backing over the pointer, the said wheel being large enough not to move the pointer before it, a short contact blade upon the tester, a long contact blade upon the tester positioned to be engaged by the pointer and touch said short blade when so engaged, an arm upon the tester, and a second pair of contact blades fixed in such position as to be closed by said arm when the tester is passing one end of the instrument scale.

10. In a transmitter of the kind set forth, the combination with a measuring instrument and the scale and pointer thereof, of a movable tester, means for moving the latter periodically over the said scale and the said pointer, an electrical circuit for controlling the transmission to a distant point of the readings of said measuring instrument and including a contact device arranged to be operated during the movement of said tester at an instant corresponding to the position of said pointer, said contact device comprising in part a blade arranged upon the tester for engagement by the pointer and operated therefrom, and means for holding the pointer stationary when the tester is passing the same.

11. In a transmitter of the kind set forth, the combination with a measuring instrument and the scale and pointer thereof, of a movable tester, means for moving the latter periodically over said pointer and in contact therewith, said tester including means operative to hold the pointer stationary as the tester passes over such pointer, and an electrical circuit for controlling the transmission to a distant point of the readings of said measuring instrument and associated with said tester so as to be operated when said tester engages said pointer to indicate the position of the pointer.

12. The combination as set forth in claim 11, said control circuit including contacts actuated by said tester when the latter registers with an end of the scale.

In testimony whereof I have signed my name to this specification.

KURT WILDE.